United States Patent
Yun et al.

(10) Patent No.: US 11,489,173 B2
(45) Date of Patent: Nov. 1, 2022

(54) FUEL CELL AND FUEL CELL STACK COMPRISING SAME

(71) Applicant: LG CHEM, LTD., Seoul (KR)

(72) Inventors: Sung Hyun Yun, Daejeon (KR); Joo Yong Park, Daejeon (KR); Do Young Kim, Daejeon (KR); Woon Jo Kim, Daejeon (KR); Kyung Mun Kang, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 302 days.

(21) Appl. No.: 15/733,531

(22) PCT Filed: Jan. 31, 2019

(86) PCT No.: PCT/KR2019/001361
§ 371 (c)(1),
(2) Date: Aug. 21, 2020

(87) PCT Pub. No.: WO2019/164151
PCT Pub. Date: Aug. 29, 2019

(65) Prior Publication Data
US 2021/0083302 A1 Mar. 18, 2021

(30) Foreign Application Priority Data
Feb. 22, 2018 (KR) .................. 10-2018-0020840

(51) Int. Cl.
*H01M 8/0258* (2016.01)
*H01M 8/1004* (2016.01)
(Continued)

(52) U.S. Cl.
CPC ....... *H01M 8/0258* (2013.01); *H01M 8/0267* (2013.01); *H01M 8/0276* (2013.01); *H01M 8/1004* (2013.01)

(58) Field of Classification Search
CPC ............. H01M 8/0258; H01M 8/0267; H01M 8/0276; H01M 8/1004; H01M 8/0273;
(Continued)

(56) References Cited

U.S. PATENT DOCUMENTS

| 6,403,249 B1 * | 6/2002 | Reid ................. H01M 8/04141 429/492 |
| 2003/0211374 A1 * | 11/2003 | Dehne ............... H01M 8/04141 429/414 |

(Continued)

FOREIGN PATENT DOCUMENTS

| JP | H08273696 | 10/1996 |
| JP | 2003263995 | 9/2003 |

(Continued)

OTHER PUBLICATIONS

Extended European Search Report corresponding to EP 19757757.0, dated Mar. 11, 2021 (7 pp).
International Search Report corresponding to PCT/KR2019/001361, dated May 15, 2019 (5 pp, including English translation).

*Primary Examiner* — Muhammad S Siddiquee
(74) *Attorney, Agent, or Firm* — Myers Bigel, P.A.

(57) ABSTRACT

The present invention relates to a fuel cell and a fuel cell stack comprising the same, and according to one aspect of the present invention, there is provided a fuel cell comprising a membrane-electrode assembly having a first surface and a second surface opposite to the first surface, wherein an anode electrode and a cathode electrode are each disposed on the first surface; an end plate disposed apart at a predetermined interval on the second surface; a first gas diffusion layer disposed on the anode electrode; a second gas diffusion layer disposed on the cathode electrode; a first separating plate disposed on the first gas diffusion layer and having a
(Continued)

plurality of flow channels; and a second separating plate disposed on the second gas diffusion layer and having a plurality of flow channels.

14 Claims, 4 Drawing Sheets

(51) Int. Cl.
*H01M 8/0267* (2016.01)
*H01M 8/0276* (2016.01)

(58) Field of Classification Search
CPC .. H01M 8/04029; H01M 8/242; H01M 8/023; H01M 8/241; Y02E 60/50
See application file for complete search history.

(56) References Cited

U.S. PATENT DOCUMENTS

| | | | |
|---|---|---|---|
| 2005/0112433 A1* | 5/2005 | Apte | H01M 8/1004 |
| | | | 429/513 |
| 2006/0093890 A1* | 5/2006 | Steinbroner | H01M 8/248 |
| | | | 429/511 |
| 2018/0342744 A1* | 11/2018 | Lee | H01M 8/04164 |

FOREIGN PATENT DOCUMENTS

| | | |
|---|---|---|
| JP | 2005158591 | 6/2005 |
| JP | 2005158739 A | 6/2005 |
| JP | 2006128047 | 5/2006 |
| JP | 2014192095 A | 10/2014 |
| KR | 101372027 | 3/2014 |

* cited by examiner

FUEL CELL AND FUEL CELL STACK COMPRISING SAME

CROSS REFERENCE TO RELATED APPLICATIONS

This application is a 35 U.S.C. § 371 national stage application of PCT International Application No. PCT/KR2019/001361, filed Jan. 31, 2019, which claims priority from Korean Patent Application No. 10-2018-0020840, filed Feb. 22, 2018, the contents of which are incorporated herein in their entireties by reference. The above-referenced PCT International Application was published in the Korean language as International Publication No. WO 2019/164151 on Aug. 29, 2019.

TECHNICAL FIELD

The present invention relates to a fuel cell and a fuel cell stack comprising the same.

BACKGROUND ART

Generally, a fuel cell is an energy conversion device that generates electric energy through an electrochemical reaction between an oxidant (fuel) and a reducing agent, which has an advantage that power can be continuously generated as long as the fuel is continuously supplied.

FIGS. 1 and 2 are schematic diagrams showing a conventional fuel cell stack (1).

The fuel cell stack (1) comprises a plurality of fuel cells (10), and the plurality of fuel cells is laminated to form a stack.

The fuel cell stack (1) may comprise a membrane-electrode assembly (MEA) (11) equipped with an electrode layer formed by coating an anode (11a) and a cathode (lib) around an electrolyte membrane composed of a polymer material, respectively, a thermal pressure-sensitive adhesive protective film (17) (sub-gasket) of a plastic film material on the outer circumference of the electrode layer region, a gas diffusion layer (12) (GDL) functioning to distribute reactive gases evenly throughout a reaction zone and to transfer electrons generated by oxidation reaction of the anode electrode toward the cathode electrode, a separating plate (13) (bipolar plate) of graphite and metal materials for supplying reactive gases to the gas diffusion layer and having the same function, and a gasket (18) of an elastic rubber material disposed on the outer periphery of the reaction zone of the separating plate or the membrane-electrode assembly to prevent leakage of reactive gases and cooling water.

The separating plate (13) comprises a plurality of ribs (14) in contact with the gas diffusion layer (12) and a plurality of channels (15) for guiding the flow of the reaction gas. Also, the separating plate (13) has a cooling water channel (16) for guiding the flow of the cooling water therein.

Furthermore, the ion moving direction is formed along the membrane thickness direction (F).

In particular, the polymer electrolyte fuel cell requires humidification of the fuel in order to secure ionic conductivity of the polymer electrolyte. Specifically, a hydrogen fuel cell is a device converting into electric energy through a redox reaction of hydrogen gas and oxygen (air) gas, and for ion conduction, water (humidification) is required for a catalyst layer, which is a reaction surface, and the electrolyte membrane, which is a medium of ion conduction, for electrochemical reactions.

For this reason, humidification is required for the reaction of hydrogen and air as reactants, and fuel cell technology driven by low humidification or no humidification is required for humidifier capacity reduction and system cost reduction. Accordingly, techniques for various self-humidifying methods for securing a humidification amount in a low humidification environment have been developed.

DISCLOSURE

Technical Problem

It is an object of the present invention to provide a fuel cell stack which is driven at low humidification or no humidification of a reactive fuel.

Technical Solution

To solve the above object, according to one aspect of the present invention, there is provided a fuel cell comprising a membrane-electrode assembly having a first surface and a second surface opposite to the first surface, wherein an anode electrode and a cathode electrode are each disposed on the first surface; an end plate disposed apart at a predetermined interval on the second surface; a first gas diffusion layer disposed on the anode electrode; a second gas diffusion layer disposed on the cathode electrode; a first separating plate disposed on the first gas diffusion layer and having a plurality of flow channels; and a second separating plate disposed on the second gas diffusion layer and having a plurality of flow channels.

Advantageous Effects

As described above, the fuel cell stack related to one example of the present invention has the following effects.

It can be operated in low humidification or no humidification, and it is possible to use non-humidifying reactants (hydrogen, oxygen (air)) when driving the fuel cell.

Particularly, it has a structure in which the reactant is injected in a non-humidified state (dray gas) and the cooling water, which is essentially supplied and operated to the fuel cell stack, can be used for humidifying the membrane-electrode assembly (MEA).

At this time, the reactant is supplied in a non-humidified state, but since one side of the membrane-electrode assembly is exposed to the cooling water, the membrane-electrode assembly can be humidified without the aid of the reactant as in the prior art.

Conventionally, gas permeation has been made along the thin thickness direction of the membrane, thereby affecting durability, but in the case of the present invention, the gas permeation is made along the surface direction of the membrane, thereby increasing the distance and the resistance, and improving OCV and durability by gas permeability reduction.

MODE FOR INVENTION

Figure 1:
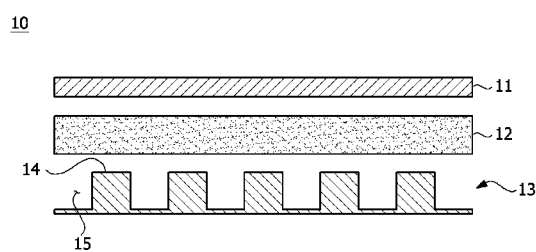
FIGS. 1 and 2 are schematic diagrams showing a fuel cell stack related to one example of the present invention.
Figure 2:
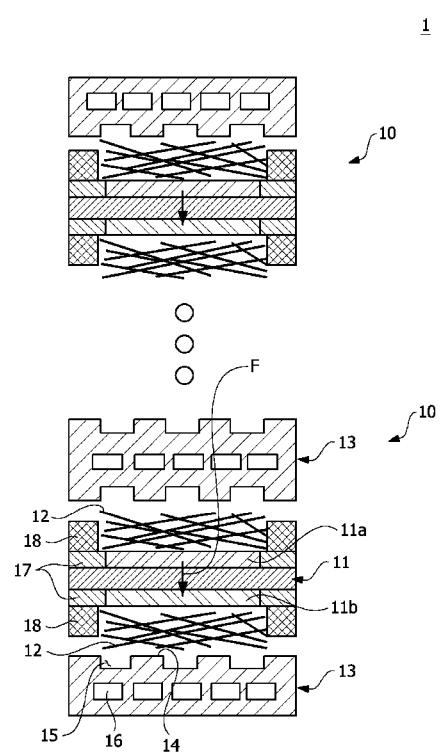

Hereinafter, a fuel cell according to one example of the present invention and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

Figure 3:
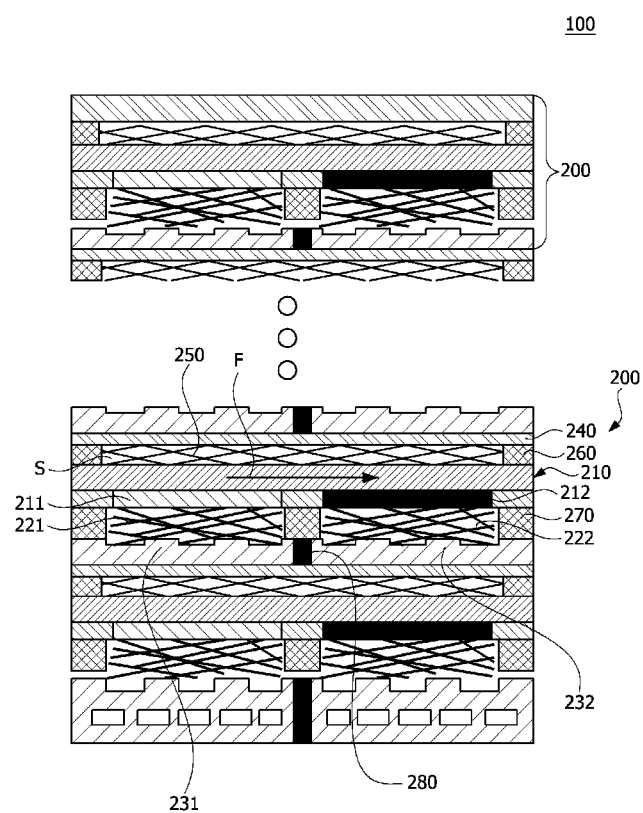
FIG. 3 is a schematic diagram showing a fuel cell stack related to one example of the present invention.
Figure 4:
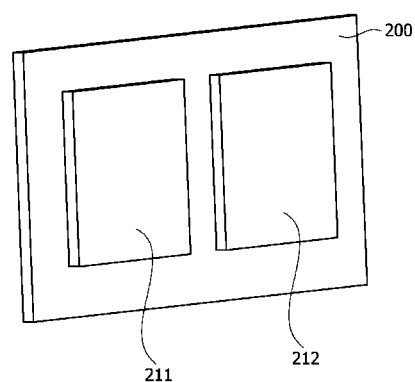
FIG. 4 is a view showing the membrane-electrode assembly shown in FIG. 3.
Figure 5:
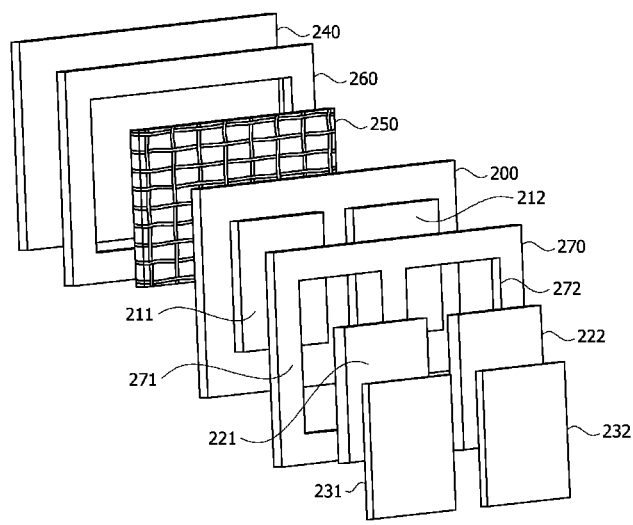
FIG. 5 is an exploded perspective view of a fuel cell related to one example of the present invention.

FIG. 3 is a schematic diagram showing a fuel cell stack (100) related to one example of the present invention, FIG. 4 is a view showing the membrane-electrode assembly (210) shown in FIG. 3, and FIG. 5 is an exploded perspective view of a fuel cell (200) related to one example of the present invention.

Figure 6:
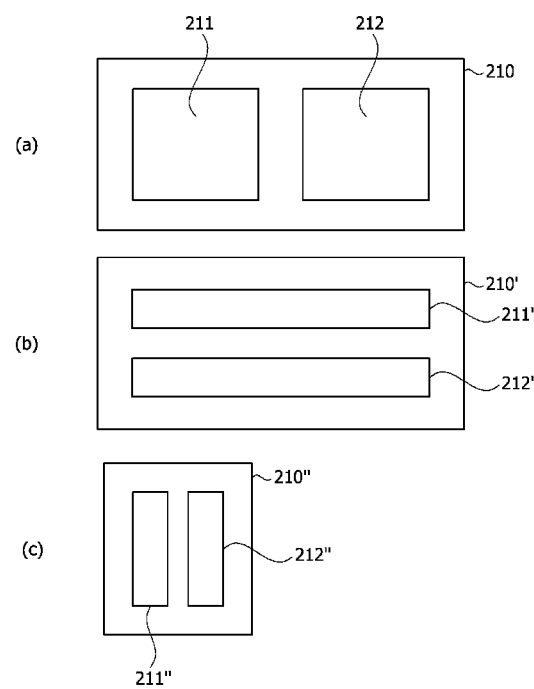
FIG. 6 is a schematic diagram showing various examples of a membrane-electrode assembly.

In addition, FIG. 6 is a schematic diagram showing various examples of a membrane-electrode assembly.

Referring to FIGS. 3 to 5, the fuel cell stack (100) comprises a plurality of fuel cells (200).

The fuel cell (200) comprises a membrane-electrode assembly (210), an end plate (240), a first gas diffusion layer (221), a second gas diffusion layer (222), a first separating plate (231) and a second separating plate (232).

Specifically, the fuel cell (200) comprises a membrane-electrode assembly (210) having a first surface and a second surface opposite to the first surface, wherein an anode electrode (211) and a cathode electrode (212) are each disposed on the first surface. Also, the fuel cell (200) comprises an end plate (240) that is disposed apart at a predetermined interval on the second surface of the membrane-electrode assembly (210). A predetermined space portion (S) is formed between the end plate (240) and the second surface of the membrane-electrode assembly (210) by a gasket (260) for preventing leakage of the cooling water, where the second surface of the membrane-electrode assembly (210) is exposed to the space portion (S).

In addition, the fuel cell (200) comprises a first gas diffusion layer (221) disposed on the anode electrode (211) and a second gas diffusion layer (222) disposed on the cathode electrode (212). That is, both the first gas diffusion layer (221) and the second gas diffusion layer (222) are disposed on the first surface of the membrane-electrode assembly (210).

Furthermore, the fuel cell (200) comprises a first separating plate (231) disposed on the first gas diffusion layer (221) and having a plurality of flow channels, and a second separating plate (232) disposed on the second gas diffusion layer (222) and having a plurality of flow channels. The first and second separating plates (231, 232) have a plurality of ribs in contact with the respective gas diffusion layers and a plurality of flow channels through which the reaction gas flows. Also, the first and second separating plates (231, 232) may have cooling water channels for guiding the flow of the cooling water therein.

In this structure, the ion moving direction is the plane direction (F) of the membrane-electrode assembly (210).

In addition, the cooling water can be supplied into the space between the end plate (240) and the second surface of the membrane-electrode assembly (210). Accordingly, the second surface of the membrane-electrode assembly (210) is exposed to the cooling water and humidified. Furthermore, the end plate (240) of any one fuel cell (200) is in contact with the first and second separating plates of another fuel cell which is adjacently laminated. At this time, the first and second separating plates of the adjacent fuel cell are cooled via the end plate (240).

That is, by supplying the cooling water to the space between the second surface of the membrane-electrode assembly (210) and the end plate (240), the cooling of the fuel cell (200) and the humidification of the membrane-electrode assembly can be performed simultaneously.

Also, a channel member for guiding the flow of the cooling water may be disposed in the space between the end plate (240) and the second surface of the membrane-electrode assembly (210). At this time, the channel member may comprise a mesh member (250). In addition, the channel member may comprise a channel and a porous mesh member.

Furthermore, the fuel cell (200) may comprise at least one first gasket (270) for individually sealing the first gas diffusion layer (221) and the second gas diffusion layer (222). For example, in order to individually seal the first gas diffusion layer (221) and the second gas diffusion layer (222), the first gasket (270) may comprise a first opening (271) in which the first gas diffusion layer (221) is accommodated, and a second opening (272) in which the second gas diffusion layer (222) is accommodated.

The first separating plate (231) and the second separating plate (232) have electrical conductivity, and in order to electrically insulate the first separating plate (231) and the second separating plate (232), the fuel cell (200) may further comprise an insulating member (280) disposed between the first separating plate (231) and the second separating plate (232). The insulating member (280) may comprise a plastic material such as acrylic, polycarbonate, Teflon and polyvinyl chloride, and the insulating member (280) may also be integrally formed of the same material as the end plate (240).

Also, the fuel cell (200) may further comprise a second gasket (260) disposed between the end plate (240) and the second surface of the membrane-electrode assembly (210). The second gasket (260) may have an opening in the central region, and the above-described mesh member (250) may be inserted into the opening.

In addition, the end plate (240) is an insulating end plate, which may have electrical insulation. The end plate (240) may be formed of an electrically insulating material. For example, the end plate (240) may be formed of a plastic material such as acrylic, polycarbonate, Teflon and polyvinyl chloride, and the end plate (240) may be formed of the same material as the insulating member (280) and may also be integrally formed with the insulating member (280).

Referring to FIG. 6, in the membrane electrode assemblies (210, 210', 210"), the anode electrodes (211, 211', 211") and the cathode electrodes (221, 221', 221") may have various shapes and sizes.

The preferred examples of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

INDUSTRIAL APPLICABILITY

The fuel cell stack related to one example of the present invention can be driven at low humidification or no humidification and has a structure capable of using non-humidifying reactants (hydrogen, oxygen (air)) when driving the fuel cell.

What is claimed is:

1. A fuel cell comprising:
a membrane-electrode assembly comprising a first surface and a second surface that is opposite to the first surface, wherein an anode electrode and a cathode electrode are each on the first surface of the membrane-electrode assembly;
an end plate spaced apart from the second surface of the membrane-electrode assembly by a predetermined distance;
a first gas diffusion layer on the anode electrode;
a second gas diffusion layer on the cathode electrode;
a first separating plate on the first gas diffusion layer, wherein the first separating plate comprises a plurality of first flow channels; and
a second separating plate on the second gas diffusion layer, wherein the second separating plate comprises a plurality of second flow channels.

2. The fuel cell according to claim 1,
wherein a space for a flow of cooling water is provided between the end plate and the second surface of the membrane-electrode assembly.

3. The fuel cell according to claim 2,
further comprising a channel member in the space, wherein the channel member is configured to guide the flow of the cooling water.

4. The fuel cell according to claim 3,
wherein the channel member comprises a mesh member.

5. The fuel cell according to claim 1,
further comprising at least one first gasket for individually sealing the first gas diffusion layer and the second gas diffusion layer.

6. The fuel cell according to claim 1,
further comprising a first gasket including a first opening in which the first gas diffusion layer is accommodated and a second opening in which the second gas diffusion layer is accommodated.

7. The fuel cell according to claim 1,
further comprising an insulating member between the first separating plate and the second separating plate.

8. The fuel cell according to claim 1,
further comprising a second gasket between the end plate and the second surface of the membrane-electrode assembly.

9. The fuel cell according to claim 1,
wherein the end plate comprises an electrical insulation material.

10. A fuel cell stack comprising the fuel cell according to claim 1.

11. The fuel cell according to claim 6, wherein the first gasket is between the membrane-electrode assembly and the first and second separating plates, and the first gasket contacts the membrane-electrode assembly and the first and second separating plates.

12. The fuel cell according to claim 7, wherein the insulating member comprises an acrylic, polycarbonate, polytetrafluoroethylene, or polyvinyl chloride.

13. The fuel cell according to claim 8, wherein the second gasket contacts an edge portion of the end plate and an edge portion of the second surface of the membrane-electrode assembly, and
wherein a space for a flow of cooling water is provided by the end plate, the second surface of the membrane-electrode assembly, and the second gasket.

14. The fuel cell according to claim 9, wherein the end plate comprises an acrylic, polycarbonate, polytetrafluoroethylene, or polyvinyl chloride.

* * * * *